INVENTOR
JAMES G. HEASLET
BY George Douglas Jones
ATTORNEY

Jan. 18, 1944.   J. G. HEASLET   2,339,334
POWER DRIVEN TRANSPORT AND TOWING VEHICLE
Filed Aug. 1, 1941   6 Sheets-Sheet 5

INVENTOR
JAMES G. HEASLET
BY George Douglas Jones
ATTORNEY

Patented Jan. 18, 1944

2,339,334

UNITED STATES PATENT OFFICE 2,339,334

POWER DRIVEN TRANSPORT AND TOWING VEHICLE

James G. Heaslet, Hudson, Ohio, assignor to The Cleveland Tractor Company, Cleveland, Ohio Application August 1, 1941, Serial No. 405,113

15 Claims. (Cl. 180—9.1)

This invention relates to a power driven vehicle and more especially to a transport and towing power driven vehicle of the track laying type.

Power driven vehicles of the track laying type have heretofore been designed as earth working and moving units, either towing the implements or having the implements mounted thereon.

Due to the obvious necessity of rugged design and power, and more especially to the side frame and track construction, these units move slowly and are of no value as a transport, where speed is an essential factor.

In the present invention, a rigid side frame is employed and is secured to the main frame, and track or bogie wheels are pivoted to the rigid side frame and provided with spring cushioning means to thereby absorb all shocks while traveling over rough terrain.

An endless track of resilient material such as rubber or the like, encircles the side frame. This type of track permits of high speeds without the danger of individual shoes forming the track, breaking away from the hinge of the same, which causes delays and is exceedingly dangerous.

An object, therefore, of the present invention is to provide a high speed mobile dirigible track laying power driven vehicle designed to provide seats positioned over-hanging the tracks and longitudinally of the tractor whereby men may be transported thereon.

Another object of the present invention is to provide longitudinally positioned seats over-hanging the tracks, on the tractor, having spaced apart openings intermediate the seats, and fuel tanks positioned in the said openings whereby the varying load of the fuel does not affect the longitudinal balance of the tractor.

Another object of the present invention is to provide spaced apart seats longitudinally positioned and over-hanging the tracks, fuel tanks positioned intermediate the seats and ammunition carrying racks adjacent the fuel tanks, providing complete longitudinal balance of the tractor at all times.

A further object of the present invention is to provide a dirigible mobile power driven vehicle of the track laying type having rapid maneuverability for combined transport and towing applications, and including the positioning and placement of variable loads whereby the removal of any or all of the loads will not materially affect the longitudinal or transverse balance of the tractor.

Another object of the present invention is to provide an ammunition carrier disposed centrally of the tractor and ammunition carriers positioned above the first mentioned carriers and independent securing means therefore, thus providing quick removable ammunition carriers.

Further and other objects of the present invention will be hereinafter set forth in the accompanying specifications and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

It will be understood that only such parts of the complete tractor have been shown in detail as are necessary for a full understanding of the invention; and various accessories or parts such as are common to tractors of this character, and which are within the knowledge of those skilled in the art, have either been omitted, or merely diagrammatically shown, for purposes of clarity and to avoid an unnecessarily lengthy specification.

Referring now to the drawings by numerals and reference wherein like numerals correspond to like parts, the main frame of the tractor is of rectangular form and comprises two longitudinally spaced apart Z beams 5; the rear ends of the beams are secured together by a transverse beam 6, the securing means being preferably performed by a welding operation. However, the members may be bolted or riveted together as desired.

Side frame supporting brackets 7 are in spaced apart relation and positioned intermediate the ends of the main frame beams, and are secured to the underside thereof. Side frame supporting members 8 are rigidly secured to the brackets 7, and secured in place by means of caps 9, which are secured in place by cap screws 11, or similar securing means.

The said side frame supporting members secured to the main frame and on the underside thereof, are provided as the tractor supporting means which will be discussed in detail as the description continues.

Centrally positioned on the main frame and rigidly secured thereto, is an engine (not shown), a hood 12 encloses the engine on three sides thereto, and is secured to the main frame preferably by inturning the longitudinal bottom edges 13 and securing the same to the frame by bolts (not shown) or other suitable securing means. One end of the hood abuts a conventional radiator (not shown) to permit cooling of the engine.

The transmission, steering and final drive housing 14 form the front end of the tractor, and it should be noted that the forward ends of the main frame are rigidly secured thereto, the securing means are not shown.

The housing contains conventional transmission drive means and is connected to a controlled differential steering mechanism which drives the sprocket drive wheels 15. The transmission shift lever 16 is positioned to the rear of the steering levers 17. A foot operated conventional clutch throwout pedal 18 is positioned to the left of the steering levers, and is operatively associated with a conventional automotive clutch.

In front of the hood 12 and to the rear of the levers is a driver's seat 19 supported on seat brackets 21 which are secured to the main frame by any conventional securing means; a dash 22 is secured to the front of the transmission case and is provided with an instrument panel 23 which carries the necessary instruments essential to the operation of the tractor.

The ends of the side frame supporting members 8 are secured to holders 24 which in turn are secured to the inner side frame members 25, preferably by a welding operation. The side frames comprise a pair of spaced apart angle members 25 and 26 secured in spaced apart parallelism by depending bogie brackets 27, and rigidly secured together by means of bolts or other suitable securing means.

The said side frames being positioned on each side of the tractor and rigidly secured thereto by supporting brackets 24 attached to the inner side of the members 25 into which side frame carrying shafts 8 are secured.

Bogie wheel arms 32 are pivotedly connected to the depending brackets 27 and axles 33 secured to the free ends of the arms on which are journaled wheels 34, preferably equipped with resilient tires 35.

Carried on the upper portion of the side frames are a pair of track support wheels 36 journaled on axles 37 which in turn are supported on carrying brackets 38 secured to the side frame members by bolts or other securing means.

The rear ends of the side frames are equipped with idler wheels 39 slidably associated with bell crank members 41, the said members being pivotally mounted to the forward end of the side frames, and resilient holding means 42 interposed between the inner end of the bell crank 41 and the side frame.

This structure is fully illustrated, described and claimed in my corresponding application, Serial No. 377,559 filed February 5, 1941, now Patent No. 2,315,421 dated Mar. 30, 1943.

On each side and adjacent the front end of the tractor are drive sprocket wheels 15, secured to axles 44 driven by the gear drive mechanism located in the housing 14; the said wheels are secured to the axles by means of nuts 45, and an endless track 43 preferably of rubber or other resilient material, encircles the drive wheels, idler and track wheels carried on the side frames.

Rear fender braces 46 are secured to the rear end of the side frame members 25 and 26, and being inclined upwardly and rearwardly, the said braces are secured to the said side frames by bolts, rivets or other suitable securing means. The upper ends of the said braces are inturned to provide a mounting for a platform.

Intermediate the ends of the side frames inverted U shaped fender carrying braces 47 are secured at their ends to side frame members 25 and 26, and a similar brace 48 is secured to the front of the side frame members, and any suitable securing means may be used. The braces 47 and 48 are preferably positioned in a vertical plane, and the upper portion of the braces form a platform supporting means.

Figure 9:
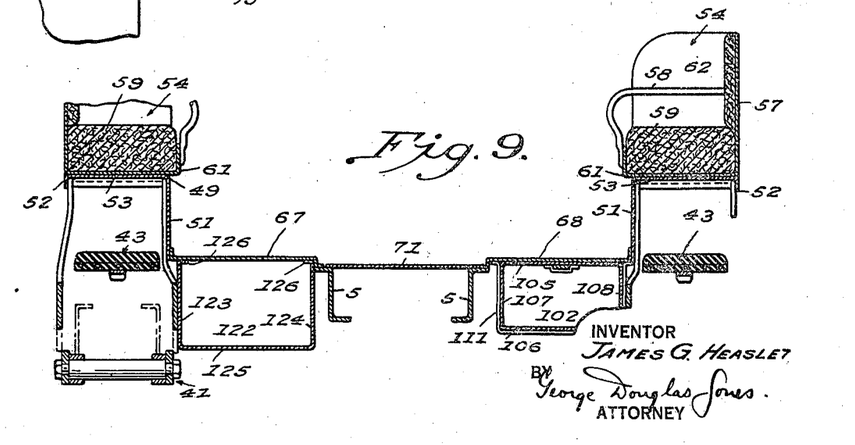
Fig. 9 is an end view of a section of the tractor taken on lines 9—9 of Fig. 1.

Fenders 49 cover the upper run of the track 43, the inner side 51, Fig. 9, of the said fenders depends downwardly to the horizontal plane of the main frame, the outer side 52 of the said fenders projects downwardly preferably only a short distance, to thereby permit easy access to the track, if desired, however, the said sides can completely cover the outer side of the side frame without departing from the scope of this invention.

The said fenders are preferably removably secured to the fender braces, the upper surface 53 of the fenders provides a platform on each end of which are positioned and secured thereto rear seats 54 and front seats 55. The positioning of the said seats provides a space intermediate the same for the mounting therebetween of fuel tanks 56.

The said seats are provided with a back rest 57, a central handle bar 58 intermediate the ends of each seat, and a cushion seat 59 carried on the base 61 and provides seating capacity for carrying two persons per seat. An inner seat wall 62 is secured to seat base 61 and back 57, and has secured thereto, towards the front of the said wall and intermediate the seat base and top, a pipe floor flange 63 into which is secured a supporting bar 64.

The said fuel tanks 56, are secured to the fender platform 53 by means of spaced apart retaining strips 66 which encircle the tanks and are secured to the said fenders.

Rear side flooring 67 and 68 is placed between the main frame members and the inner side wall of the fenders, and is secured to the main frame members 5 and the depending inner wall 51 of the fenders, being secured thereto by welding or other suitable securing means.

The center rear flooring 71 is secured by any suitable securing means to the top of the main frame members 5, thus providing a floor covering for the rear central portion of the tractor.

The front side floors 72 and 73 are also secured to the main frame members 5 and to the depending walls 51 of the fenders, and terminate at the side at the housing 14. The center front flooring is provided by the housing 14, being elevated above the said side flooring.

Intermediate the central ends of the side floorings is an open space. Below the level of the flooring and secured to the carrying shafts 8 and within the said space are positioned ammunition carrying case platforms 74 preferably of channel shape cross section and secured to the said shafts 8 by means of straps 75 and rigidly secured thereto.

Ammunition carrying cases 76 formed in a rectangular box-like shape and being open at the top, are secured to the platform 74 by means of bolts 78, which also hold the inner shell base 79 which is preferably of wood or of any resilient material, and all being secured by means of bolts 81.

A rectangular shell holder and spacer member 82, slightly less in dimension than the ammunition carrying case, and having depending legs 83 at each corner thereof, and having a plurality of circular openings in the top portion, the said openings register with and fit over the upper portion of the shells 84 which are conical in shape and provide shell spacer and hold-down means. The said shell holder 82 is secured in place by means of swing bolts 85 pivotedly connected to the ends of the cases 76. The said bolts 85 project through slots in lips 86 which form a part of the ends of the shell holder 82, the said holder is restrained from movement by means of wing nuts 87.

Powder containers 88 preferably of rectangular form are provided in the interior thereof with longitudinal spacers 89. One end of the said container being provided with a swinging closure, the swinging action being provided by means of hinges 91 and secured in closed position by means of a latch 92.

The said containers are preferably in pairs longitudinally disposed above the shell carrying cases and each pair positioned intermediate the fuel tank 56 and the hood 12. The carrying means for the containers 88 comprise a hinged base support 93, hinged to the member 64, the opposite end of which rests on a bracket 94 which is secured to the sides of the hood 12.

The said containers are preferably in pairs longitudinally disposed above the shell carrying cases, and each pair positioned intermediate the fuel tank 56 and the hood 12. The carrying means for the containers 88 comprise a hinged base support 93, hinged to the member 64, the opposite end of which rests on a bracket 94 which is secured to the sides of the hood 12.

A hinged strap arm 95 is also hinged to the member 64 and is provided at its opposite end with an eye 96 into which a flexible belt 97 is secured, and the opposite end thereof having a buckle 98 affixed thereto. Brackets 99 are secured to the sides of the hood 12 into which a flexible belt 101 is secured at one end, the other end of the said belt is provided with a plurality of spaced apart holes, the said belt being associated with the buckle 98 and provides securing means for the said containers 88.

Figure 1:
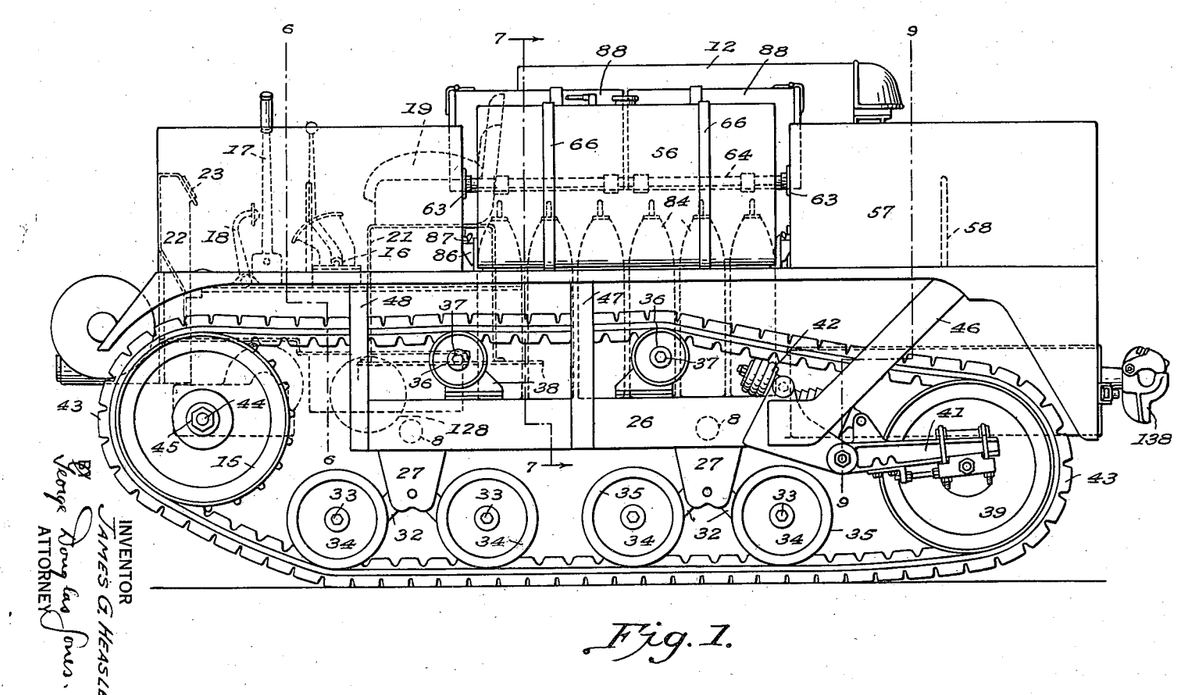
Fig. 1 is a side elevational view of the tractor described in the present invention.
Figure 2:
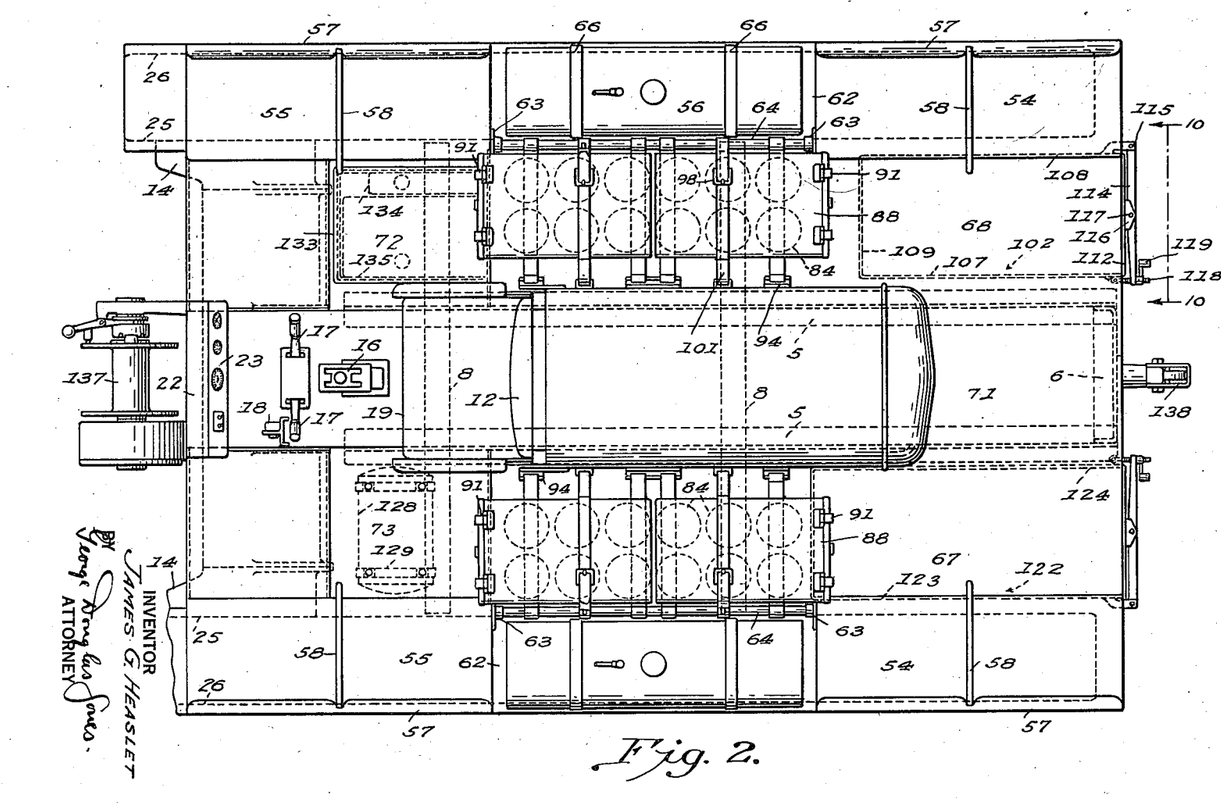
Fig. 2 is a top plan view of the tractor.
Figures 3, 4:
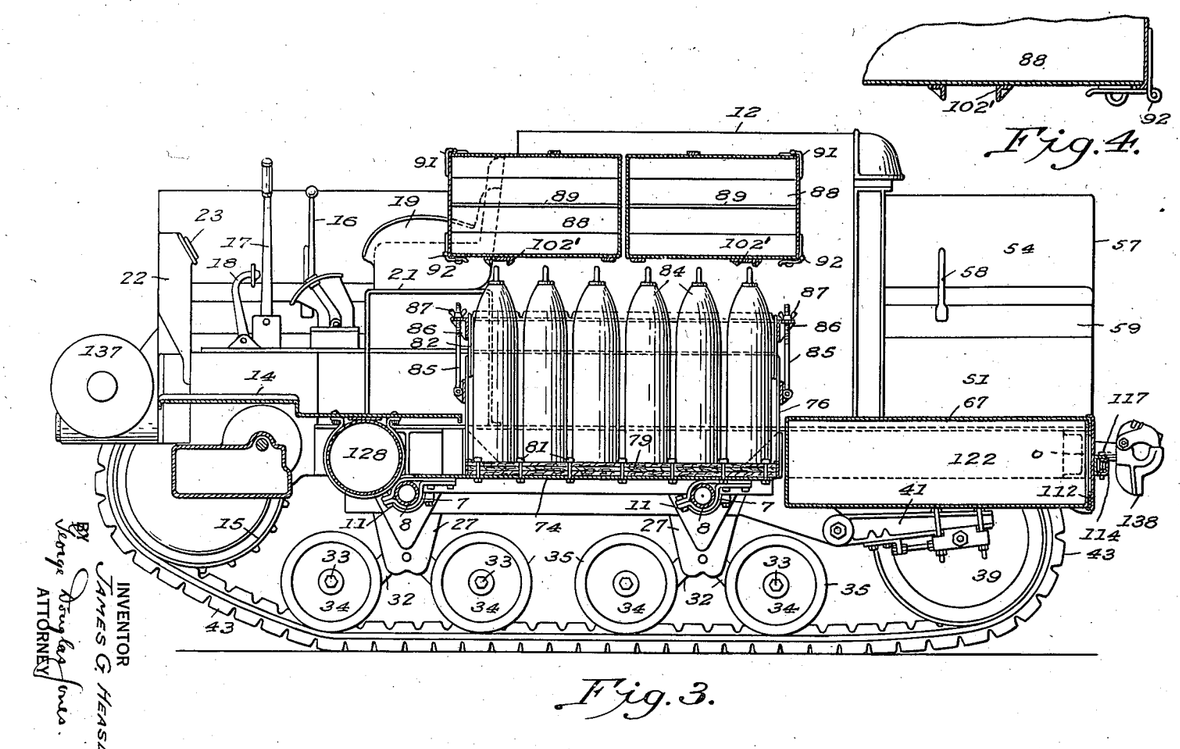
Fig. 3 is a sectional view of the tractor, taken on lines 3—3 of Fig. 5.
Fig. 4 is a fragmental sectional view of the lower end of the powder container.
Figure 5:
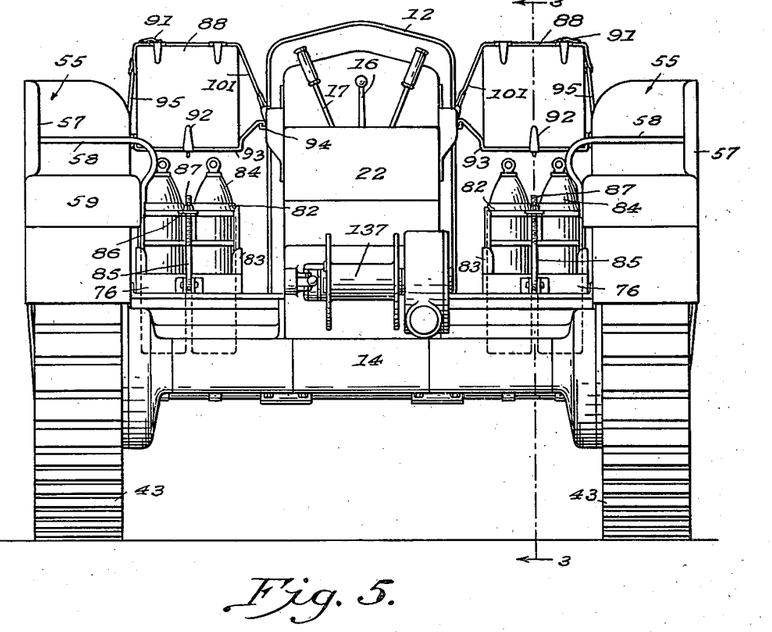
Fig. 5 is a front elevational view of the tractor.
Figure 6:
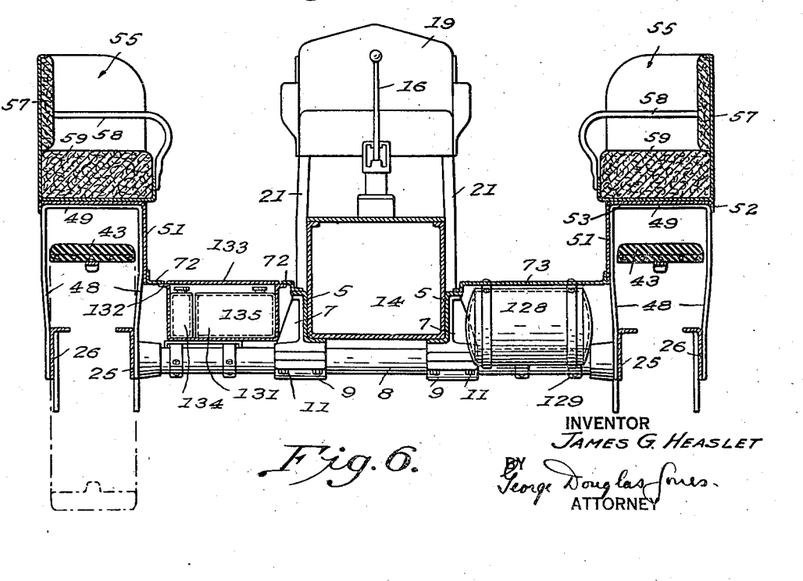
Fig. 6 is a rear sectional rear view of the tractor taken on lines 6—6 of Fig. 1.
Figure 7:
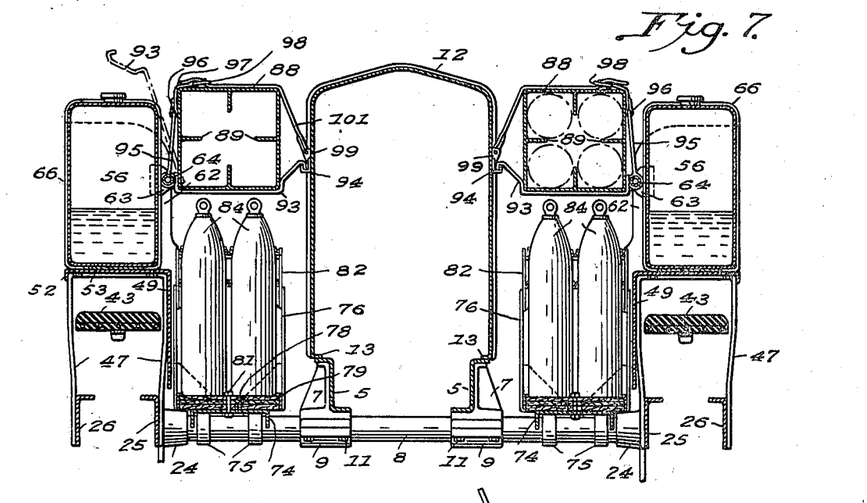
Fig. 7 is a sectional front view of the tractor taken on lines 7—7 of Fig. 1.
Figure 8:
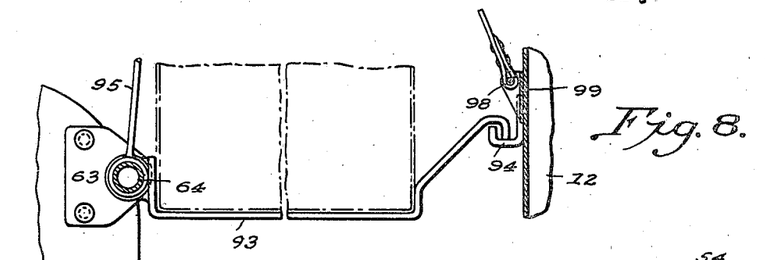
Fig. 8 is a side view of the powder container supports.

When the containers 88 are removed from the carrying and securing means therefor, and it is desired to remove shells from the container 76, the hinged base support members 93 may be swung upward and retained in this position as indicated by the dotted lines in Fig. 7.

The said containers 88 are preferably provided with and on the underside thereof a pair of spacer blocks 102' disposed in spaced apart relation, the space between the said blocks being sufficient to slide over one of the hinged base supports 93.

It should be here noted that the variable load containers, including the fuel tanks 56, ammunition racks 76 and powder containers 88, are all positioned centrally of the longitudinal axis of the tractor, which permits removal of all or a part of the load carried therein, without affecting the longitudinal balance of the tractor. The partial or wholly unloading of a tractor of the track laying type, wherein high speeds are essential, requires maintaining a balance of the tractor load, especially wherein high speeds are desired; this balance is also extremely important wherein quick maneuverability together with stability of the tractor is required.

The positioning of the passenger load is also of importance and is obviously efficiently provided for in the present invention.

The further balancing of the tractor by the placement of additional variable loads will be apparent as the description proceeds.

Positioned at the rear of the tractor and on the underside of the floor 68 is a fuse carrier 102, which comprises a watertight rectangular container having a top 105, a bottom 106, side walls 107 and 108, and a rear wall 109, the front of the carrier being open. The said carrier is supported, with the top 105 in juxtaposition with the underside of the floor 68, and secured thereto by supporting straps 111. A watertight closure 112 encloses the open end of the carrier and is provided with a hinge bracket 113 positioned on side wall 108, into which a hinge strap 114 is pivoted by means of the pin 115. A channel shaped pivot bracket 116 is secured to the closure member 112 and is pivoted to the closure by pin 117. The said strap extends beyond the wall 107, and is provided with an elongated slot in the end of the same, into which a hinged member 118 slides. The said member is provided with a threaded end, on which a wing nut 119 is positioned, and when drawn down pulls the closure 112 snugly against the container 104, and through the medium of a gasket 121 which surrounds the inner side of the closure 112, forms a water tight container.

Figure 10:
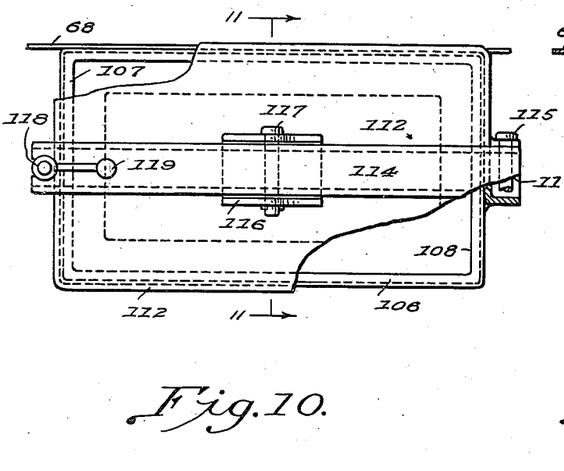
Fig. 10 is an end view of a container closure means.
Figure 11:
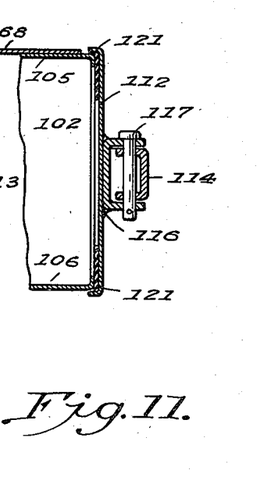
Fig. 11 is a sectional view taken on lines 11—11 of Fig. 10.

A tool container 122 positioned under the floor 67, the said container having side walls 123 and 124, an end wall (not shown) and a bottom 125. The top edges of the walls are turned inwardly at 126, thus forming a means to secure the container to the underside of the floor 67. The securing is preferably a welding operation, or the container may be bolted to the said floor. A closure means identical with the closure means for the fuse carrier 104 is used on the tool container and illustrated in Fig. 10 of the drawings.

An air tank or air container 128 is secured to the underside of the floor 73 by means of straps 129.

A container 131 having a bottom, side and end walls; the upper edge of the walls are outturned at 132, and are secured to the underside of the flooring 72 by any suitable securing means such as welding or bolting the same to the flooring. It should be noted that the floor is cut out above the container 131 slightly greater than the area of the container. The cut out flooring forms a cover 133 which permits of access to the contents of the container which may consist of oil in cans 134 and 135, or the like.

A winch 137 may be positioned on the forward end of the tractor and connected to be driven by the gearing within the transmission case.

A pintle hook 138 of conventional design is positioned at the rear end of the tractor and rigidly secured to the cross member 6 of the main frame. It is used as an attaching means for towing additional dirigible units.

It should be further noted that the location of the several containers above described, wherein they are positioned below the flooring or main frame of the tractor, are so positioned, that whether fully loaded or unloaded, will have little or no effect on the longitudinal or transverse balance of the tractor, due to the low center of gravity of the containers.

The above described invention comprises a high speed dirigible mobile unit, capable of transporting a gun crew, ammunition, powder and other material, and is provided to tow a field piece at high speeds, permitting extreme flexibility of maneuver over rough terrain, regardless of the variation of weight of the transported load, thus maintaining a balance of the tractor under normal or abnormal speed, terrain and steering conditions.

Applicant is fully away of the prior art, with reference to the instant invention, and believes that he has developed a combination of design in a tractor that produces a new and most useful contribution to the art.

I claim:

1. In a track laying tractor, a longitudinal main frame, having an engine mounted centrally thereon, a pair of laterally extending transverse arms secured in spaced relation to said main frame, rigid parallel side frames secured to said arms in spaced relation to said main frame, supporting wheels mounted on said side frames and sprocket drive wheels carried on the main frame, flexible tracks encircling said supporting wheels and said sprocket wheels, fuel tanks mounted on the said side frames intermediate the ends thereof, and central weight carrying platforms secured to the said transverse arms between the sides of the main frame and the spaced rigid side frames whereby the major part of the weight of the tractor is positioned adjacent the longitudinal center thereof.

2. A tractor as described in claim 1, wherein the laterally extending spaced arms are secured to the underside of the main frame and to a point below the tops of the rigid side frames.

3. A tractor as set forth in claim 1, wherein the plane of the central weight carrying platforms secured to the transverse arms are below the top plane of the main frame.

4. A tractor as set forth in claim 1, wherein the centrally located side fuel tanks are mounted on brackets secured to the spaced rigid side frames and lie parallel to and in elevated position above the said weight carrying platforms.

5. A tractor as set forth in claim 1, wherein longitudinal fenders are mounted on and above the rigid side frames in such a manner as to enclose the top flight of the flexible tracks.

6. A tractor as set forth in claim 1, wherein continuous longitudinal fenders are mounted on upwardly extending brackets secured to the said rigid side frames, with the said centrally positioned fuel tanks carried on said fenders and a plurality of inwardly facing occupant seats arranged on said fenders at both ends of said fuel tanks.

7. A tractor as set forth in claim 1, wherein the centrally positioned engine carried on said main frame is enclosed by a hood, and fenders are secured to said rigid side frames above the flexible drive chains with the said fuel tanks carried on the fenders, the combination therewith of end supported bars lying parallel to said fuel tanks and side elevated weight carrying receptacles supported by said bars and the said engine hood.

8. In a tractor of the type having side frames, drive sprocket wheels, idler wheels and track wheels, an endless track encircling the said side frames and wheels, a main frame for the said tractor, and an engine carried by the main frame, the combination therewith of a hood covering the said engine; a plurality of seats disposed on opposite sides of the said tractor and above the said tracks, fuel tanks positioned over the tracks intermediate the seats and supported on the side frames, an ammunition rack positioned intermediate the ends of the tractor between the said fuel tanks and the said hood, supports hinged to supporting means secured to said seats and supported on brackets secured to the said hood, and a removable and secondary ammunition rack supported above the first mentioned ammunition rack, and carried by the said supports.

9. In a tractor of the crawler type having a main frame, a motor, a hood covering the motor, drive gears therefor, drive sprocket wheels secured to the main frame, a side frame secured to the main frame, idler wheels and track wheels mounted on the said side frame, and an endless track encircling the said sprocket wheels, track wheels and idler wheels, the combination therewith of seat supports secured to the side frame and overhanging the tracks on each side of the tractor, seats secured to the said seat supports, the said seats being spaced to provide a space approximately intermediate the ends of the tractor, a fuel tank mounted in the said space and secured to the seat supporting brackets, an ammunition carrying frame secured to the main frame of the tractor, removable ammunition racks secured to the said frame and positioned intermediate the fuel tank and the engine of the tractor, and a secondary ammunition rack supported by the hood and by supporting means secured to the said seats.

10. In a tractor of the track laying type having a main frame, a motor mounted thereon, a hood covering the motor, drive gear mechanism and drive sprocket wheels associated with the said drive gear mechanism and carried by the main frame, side frames carried by the main frame, idler wheels and track wheels carried by the said side frames, an endless track encircling the said drive wheels, idler wheels and track wheels; the combination therewith of laterally extending brackets secured to the said side frames and overhanging the tracks on each side of the tractor, seats positioned on the said brackets and placed longitudinally of the tractor and a space provided centrally of the tractor and intermediate the seats thereon, fuel tanks mounted on the said brackets located intermediate the seats, ammunition carrying racks intermediate the fuel tanks and the motor, and secured to the said main frame, a secondary ammunition rack positioned above the first mentioned carrying rack and supported on hinged brackets, and securing means therefor, a fuse carrying chamber positioned between the main frame and the side frame of the tractor and at the rear thereof, the said chamber being provided with waterproof closure means.

11. In a tractor of the track laying type having a main frame, an engine carried by the main frame, a hood covering the engine gear transmission means associated with the engine, and track driving means associated with the said gear mechanism, side frames rigidly secured to the tractor, track wheels and idler wheels carried by the side frames, and an endless track encircling the said drive wheels, idler wheels and track wheels; the combination therewith of a flooring secured to the main frame of the tractor and covering the sides, front and rear of the same, brackets secured to the side frames and overhanging the said tracks, a pair of seats on each side of the tractor secured to the said brackets and positioned longitudinally of the tractor, providing a space intermediate the said seats, a fuel tank positioned in the space intermediate the seats and overhanging the tracks, a driver's seat positioned forwardly of the tractor, openings in the floor on each side of the tractor and adjacent the motor, an ammunition supporting member rigidly secured to the main frame of the tractor and located below the level of the floor, ammunition racks depending through the openings in the floor and secured to the supporting member, and a secondary ammunition rack carried on brackets secured to the hood and to supporting means attached to said seats and securing means for the said secondary ammunition carrier.

12. In a tractor of the track laying type having a main frame, a motor carried by the main frame, a hood covering the motor, gear transmission means associated with the motor, and track driving means associated with the said gear mechanism, side frames rigidly secured to the tractor, track wheels and idler wheels carried by the side frames, and an endless track encircling the said drive wheels, idler wheels and track wheels; the combination therewith of a flooring secured to the main frame of the tractor and covering the sides, front and rear thereof, brackets secured to the side frames and overhanging the said tracks, a pair of seats secured to the said brackets and positioned longitudinally of the tractor on each side thereof, and providing a space intermediate the said seats, a fuel tank positioned in said space intermediate the seats and overhanging the tracks, a driver's seat positioned forwardly of the tractor, openings in the floor on each side of the tractor and adjacent the said motor, ammunition supporting members rigidly secured to the frame of the tractor and located below the level of the floor, ammunition racks depending through the openings in the floor and secured to the said supporting members, and secondary ammunition racks positioned above the first mentioned ammunition racks and securing means for the said secondary ammunition carriers, an ammunition container mounted and secured below the floor and at the rear and on one side of the tractor, and water tight closure means for the said container, a tool carrying container mounted below the floor and secured thereto and located on the opposite side of the rear end of the tractor and water tight closure means for the container.

13. A military tractor peculiarly adapted for carrying a driver, a gun crew, ammunition, equipment and for hauling a mobile field piece comprising a track laying vehicle having a main frame and lateral spaced parallel rigid side frames, track supporting wheels mounted on the side frames, a prime mover on the central section of the main frame, transverse drive shafts extending across the front of the main frame and terminating in sprocket wheels, said shafts being connected to said prime mover through suitable change speed, braking and control mechanism, flexible ground engaging tracks encircling said sprockets and track supporting wheels, a driver's seat positioned forward of said prime mover and above and to the rear of said drive shafts, longitudinal fenders overlying the rigid side frames and gun crew seats secured to the fenders.

14. A military tractor possessing a low longitudinal center of gravity including a main frame having a centrally located engine thereon, spaced parallel side frames rigidly secured to said main frame, a forward transverse drive shaft driven by said engine, control means therefor, drive sprockets on the ends of said drive shaft, idler wheels carried by said side frames and flexible tracks encircling said drive sprockets and idler wheels, longitudinally extending fenders secured to said side frames and overlying the said tracks, fuel tanks carried on said fenders intermediate the ends of said fenders, ammunition carrying platforms positioned between the main frame and the side frames adjacent the engine and the said fuel tanks, a driver's seat forward of the said engine and gun crew seats mounted on said fenders on opposite sides of said fuel tanks.

15. A military tractor possessing a low longitudinal center of gravity including a main frame having a centrally located engine thereon, spaced parallel side frames rigidly secured to said main frame, a forward transverse drive shaft driven by said engine, control means therefor, drive sprockets on the ends of said drive shaft, idler wheels carried by said side frames and flexible tracks encircling said drive sprockets and idler wheels, longitudinally extending fenders secured to said side frames and overlying the said tracks, fuel tanks carried on said fenders intermediate the ends of said fenders, flooring carried by the main frame and fenders, ammunition carrying platforms positioned between the main frame and the side frames adjacent the engine and the said fuel tanks, a driver's seat forward of the said engine and gun crew seats mounted on said fenders on opposite sides of said fuel tanks and compartments secured to the underside of the flooring at the front and rear of the tractor and waterproof closure means for the said compartments.

JAMES G. HEASLET.